(12) United States Patent
Wigh

(10) Patent No.: US 11,217,117 B1
(45) Date of Patent: Jan. 4, 2022

(54) APPARATUS, SYSTEM, AND METHOD FOR AN ELECTRONICALLY ASSISTED CHESSBOARD

(71) Applicant: Bryght Labs, Inc., Overland Park, KS (US)

(72) Inventor: Jeffrey Bowman Wigh, Overland Park, KS (US)

(73) Assignee: Bryght Labs, Inc., Overland Park, KS (US)

( * ) Notice: Subject to any disclaimer, the term of this patent is extended or adjusted under 35 U.S.C. 154(b) by 0 days.

(21) Appl. No.: 17/022,341

(22) Filed: Sep. 16, 2020

(51) Int. Cl.
*G09B 19/22* (2006.01)
*G09B 5/02* (2006.01)

(52) U.S. Cl.
CPC ............... *G09B 19/22* (2013.01); *G09B 5/02* (2013.01)

(58) Field of Classification Search
CPC .................................. G09B 19/22; G09B 5/02
USPC ........................................................ 434/128
See application file for complete search history.

(56) References Cited

U.S. PATENT DOCUMENTS

| | | | |
|---|---|---|---|
| 4,391,447 A * | 7/1983 | Dudley ................. | G09B 19/22 273/238 |
| 6,168,158 B1 | 1/2001 | Bulsink | |
| 8,517,383 B2 | 8/2013 | Wallace et al. | |
| 8,525,799 B1 | 9/2013 | Grivna et al. | |
| 8,702,512 B2 | 4/2014 | Mineur et al. | |
| 9,618,316 B2 | 4/2017 | Zachut et al. | |
| 10,108,271 B2 | 10/2018 | Flagg et al. | |
| 10,150,039 B2 | 12/2018 | Thomas et al. | |

(Continued)

FOREIGN PATENT DOCUMENTS

WO 2012116233 A2 8/2012

OTHER PUBLICATIONS

"This Maker Built a Game Board that Lights up Correct Moves," Arduino Team, https://web.archive.org/web/20181020133756/https://blog.arduino.cc/2017/04/17/this-maker-built-a-game-board-that-lights-up-correct-moves/, Oct. 20, 2018 (Year: 2018).*

(Continued)

*Primary Examiner* — Thomas J Hong
*Assistant Examiner* — Jennifer L Korb
(74) *Attorney, Agent, or Firm* — Build IP, LLC; Robert V. Donahoe

(57) ABSTRACT

An electronic chess set includes a plurality of game pieces, a chessboard having a playing surface including a plurality of individually identifiable locations visible to a user on the chessboard, an illumination system configured to illuminate each of the plurality individually identifiable locations and an electronic system coupled to the illumination system. Each of the individually identifiable locations is configured to receive any one of the plurality of game pieces. The electronic system includes a processor configured to determine when a user is in contact with a selected one of the plurality of game pieces and control an operation of the illumination system to illuminate the playing surface to provide a visual identification of at least one move available for the selected piece in view of a handicap level provided for the user. The at least one move is categorized in one of a plurality of move categories based on a strength of the at least one move and the visual identification communicates a move-category included in the plurality of move categories for the at least one move.

16 Claims, 3 Drawing Sheets

(56) References Cited

U.S. PATENT DOCUMENTS

2009/0315258 A1\* 12/2009 Wallace ............... G06F 3/0443
 273/238
2014/0032146 A1 1/2014 Wallace et al.

OTHER PUBLICATIONS

"ChessBase 14: It Helps You to Play Better!" Chess News, https://web.archive.org/web/20161208140820/https://en.chessbase.com/post/chessbase14-assisted-analysis-tutorial, Dec. 8, 2016 (Year: 2016).\*

"Knight Light LED Chess," DeSantis et al., Dec. 2012, published at least as early as Apr. 14, 2020 (Year: 2020).\*

"ChessMate Capstone Final Presentation," Schulz et al., http://www.ece.ucsb.edu/Faculty/Johnson/ECE189/final/chessmate.pdf, Aug. 3, 2016 (Year: 2016).\*

\* cited by examiner

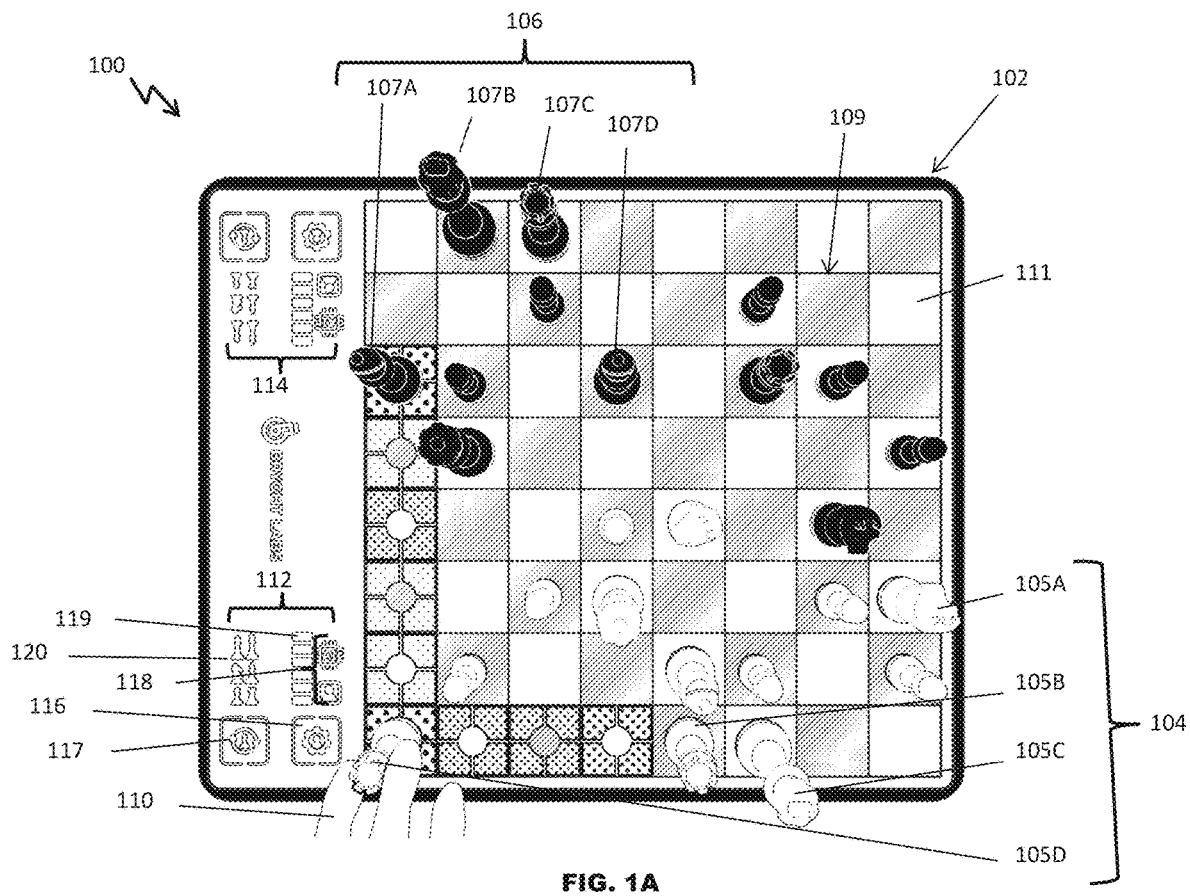
FIG. 1A
| | a | b | c | d | e | f | g | h |
|---|---|---|---|---|---|---|---|---|
| 8 | a8 | b8 | c8 | d8 | e8 | f8 | g8 | h8 |
| 7 | a7 | b7 | c7 | d7 | e7 | f7 | g7 | h7 |
| 6 | a6 | b6 | c6 | d6 | e6 | f6 | g6 | h6 |
| 5 | a5 | b5 | c5 | d5 | e5 | f5 | g5 | h5 |
| 4 | a4 | b4 | c4 | d4 | e4 | f4 | g4 | h4 |
| 3 | a3 | b3 | c3 | d3 | e3 | f3 | g3 | h3 |
| 2 | a2 | b2 | c2 | d2 | e2 | f2 | g2 | h2 |
| 1 | a1 | b1 | c1 | d1 | e1 | f1 | g1 | h1 |
FIG. 1B
| Position in FIG. 1A | Move-category | Category ID |
|---|---|---|
| A6 | = excellent |  |
| D1 | = inaccuracy (ok) | |
| C1, B1, A4 | = mistake (bad) |  |
| A2, A3, A5 | = blunder (terrible) |  |
FIG. 1C

APPARATUS, SYSTEM, AND METHOD FOR AN ELECTRONICALLY ASSISTED CHESSBOARD

BACKGROUND OF INVENTION

1. Field of Invention

This invention relates generally to electronic game boards. More specifically, at least one embodiment, relates to an apparatus, system and method for an electronically assisted chessboard.

2. Discussion of Related Art

Chessboards that include an electronic system (i.e., smart chessboards) are well known. These chessboards typically provide an artificial intelligence (AI) opponent that a user competes against. Some of these boards can connect to a personal computer and/or the Internet. In operation, the smart chessboard operates to track the position of pieces on the chessboard and identify moves, for example, the move that should be made on behalf of the AI opponent. The smart chessboard may also identify to the user a move that they can select during competition. However, the AI assistance is provided in the form of an instruction for the player to follow. While this may allow the user to win a particular match these overt hints may not provide any lasting improvement in the user's strategic understanding of the game of chess. That is, a repeated set of matches played using the moves recommend to the user by the AI assistant may not provide the user with any improvement in their ability to arrive at the best move unaided. Furthermore, they can stunt the player's development by not allowing the player to make mistakes that would otherwise be instructive and allow the player to more rapidly develop their chess playing skills. These drawbacks result in a lower level of enjoyment that can cause individuals to lose interest in the game of chess over time.

Where a chessboard can connect to a computer and/or the Internet, the user's attention may be drawn to a PC or a portable electronic device running an application associated with the chessboard. This creates an undesirable result of increasing a players "screen time" during a match rather than having the match create a desired disconnect from these electronic devices.

The detection of a user's interaction with game pieces (for example, touching a game piece) is also known. However, the detection of a user's game-piece selection is not available in chess pieces.

SUMMARY OF INVENTION

Therefore, there is a need for chessboards that provide in-match feedback to increase a user's skill level and understanding of the game of chess while maintaining their focus on the tangible chess game board and chess pieces. According to some embodiments, an electronic system included in a chessboard operates to handicap matches by providing on-board feedback to the user regarding a subset of moves available to the user based on the current game-state and the skill level of the player(s). The subset of moves can be selected from a full set of moves available to the user based on a desired level of assistance selected for the user. In one embodiment, the level of assistance can be selected to properly handicap matches based on a skill level established for two user's competing in a match or the skill level established for a user competing against an AI opponent. In further embodiments, the level of assistance is selected to effectively train the user over time to independently, and without aid, arrive at a move-selection that best improves their odds of winning a match.

According to one embodiment, the set of moves can be displayed to the user on the chessboard. In a further embodiment, the moves are displayed in response to a game-piece being touched by the user. For example, the moves that are selected for display are selected based on the desired handicap or level of instruction and the piece being touched by the user. Where a user does not touch any game-piece, the AI aided instruction is not displayed leaving discovery to the user. For example, if the user does not select the game-piece that provides the best move available, that move will not be highlighted. These embodiments can improve the training provided by the system by allowing the user to determine their desired move, select the piece and then review the move or moves determined by the AI assistant for the same piece.

Embodiments described herein provide a further advantage because the smart chessboard does not require any Internet access. This increases the portability and utility of the chessboard by allowing the user to play chess anywhere they choose to carry the board.

According to one aspect, a method provides instructions to a player in a chess match. The chess match is played using a chessboard including an electronic system with an illumination system. The chessboard is included in a chess set including a plurality of chess pieces. The method includes determining a handicap level for a human player, determining a location on the chessboard of each chess piece located on the chessboard, respectively, each chess piece included in the plurality of chess pieces, and identifying a move category for each move included in a set of moves available for each chess piece located on the board, respectively. According to one embodiment, the method includes sensing contact by the human player with a chess piece selected from the chess pieces remaining on the chessboard and, in response to the sensed contact, displaying on the chessboard at least one move available for the selected chess piece, the at least one move selected for display because the move category of the at least one move is consistent with the handicap level for the human player.

According to another aspect, a method provides instructions to a player in a chess match. The chess match is played using a chessboard including an electronic system with an illumination system. The chessboard is included in a chess set including a plurality of chess pieces. The method includes determining a handicap level for a human player, determining a location on the chessboard of each chess piece located on the chessboard, respectively, each chess piece included in the plurality of chess pieces, and identifying a move category for each move included in a set of moves available for each chess piece located on the board, respectively. Further, the method includes associating each move included in the set of moves with one of a plurality of move-categories, each of the move-categories indicative of a strength of any moves included in the move-category relative to the strength of moves included in others of the plurality of move-categories. In one embodiment, the chessboard is operated in a first operating mode where a display of the at least one move only occurs in response to sensed contact such that there are no moves displayed without contact by the human player with any one of the chess pieces remaining on the chessboard. According to one embodiment, the method includes sensing contact by the human player with a chess piece selected from the chess pieces remaining on the chessboard and, in response to the sensed contact, highlighting on the chessboard at least one move available for the selected chess piece, the at least one move highlighted because the move-category of the at least one move is consistent with the handicap level for the human player. The at least one move is highlighted in a manner that distinguishes the at least one move from moves in a plurality of different move-categories, respectively, that are included in a set of moves available for the selected chess piece, According to yet another aspect, an electronic chess set is provided. The electronic chess set includes a plurality of game pieces, a chessboard having a playing surface including a plurality of individually identifiable locations visible to a user on the chessboard, each of the locations configured to receive any one of the plurality of game pieces, an illumination system configured to illuminate each of the plurality individually identifiable locations, and an electronic system coupled to the illumination system. According to one embodiment, the electronic system includes a processor configured to determine when a user is in contact with a selected one of the plurality of game pieces and control an operation of the illumination system to illuminate the playing surface to provide a visual identification of at least one move available for the selected piece in view of a handicap level provided for the user. Further, the at least one move is categorized in one of a plurality of move categories based on a strength of the at least one move, and the visual identification communicates a move-category included in the plurality of move categories for the at least one move.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1A illustrates an electronic game board in accordance with one embodiment;

FIG. 1B illustrates algebraic notation for the electronic game board of FIG. 1A according to one embodiment;

FIG. 1C illustrates a legend for the display-features employed with the electronic game board of FIG. 1A according to one embodiment;

DETAILED DESCRIPTION

Figure 2:
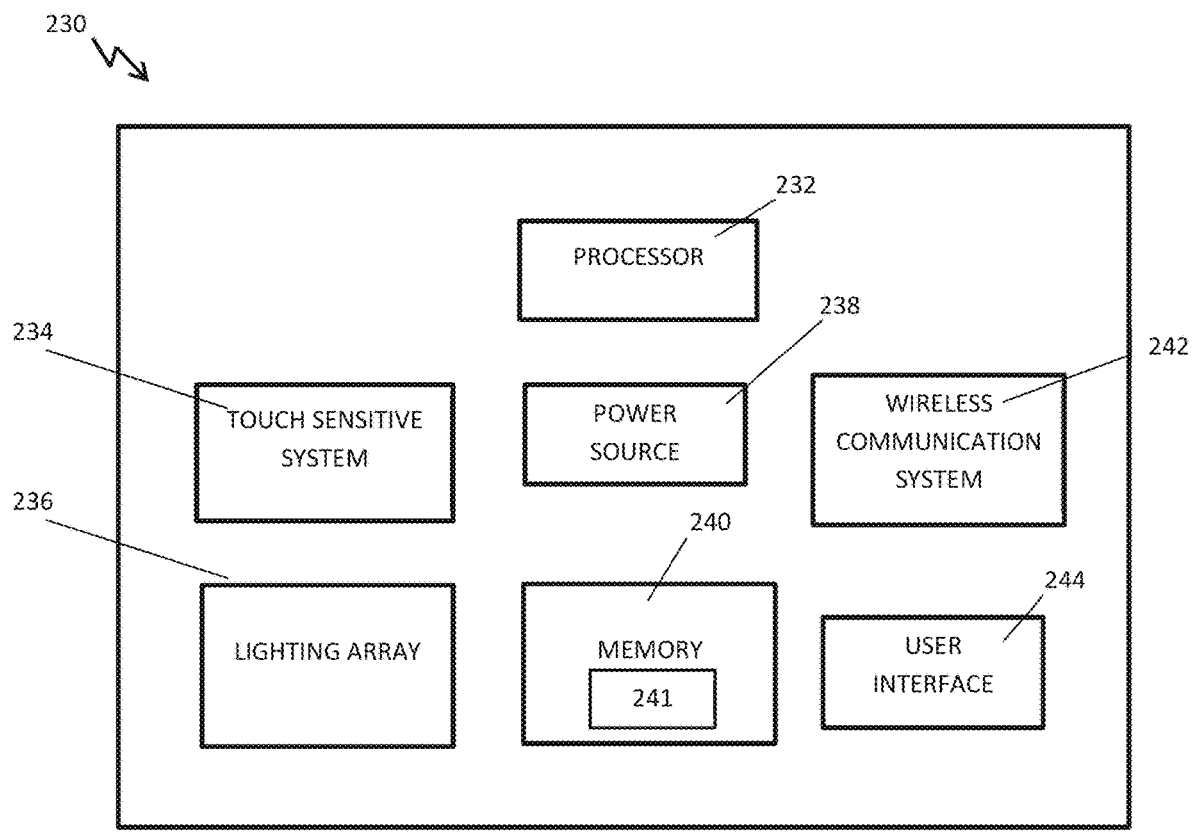
FIG. 2 illustrates a system level block diagram of an electronic system in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Referring now to FIG. 1A, a chess set 100 is illustrated in accordance with various embodiments. The chess set 100 includes a chessboard 102, a first plurality of chess pieces 104, and a second plurality of chess pieces 106. A subset of each of the first plurality of chess pieces 104 and the second plurality of chess pieces 106 is identified with reference characters, respectively, for purposes of this description. According to the illustrated embodiment, the first plurality of chess pieces 104 includes a knight 105A, a first rook 105B, a king 105C and a second rook 105D. The second plurality of chess pieces 106 includes a first bishop 107A, a king 107B, a rook 107C and a second bishop 107D. As illustrated in FIG. 1A, a human player 110 is in contact with the second rook 105D.

The chessboard 102 includes a playing surface 109, a first user interface 112 and a second user interface 114. In the illustrated embodiment, the playing surface 109 includes a checkboard pattern with a plurality of individually identifiable locations, for example, the square 111. Depending on the embodiment, the playing surface 109 can include printed graphics, an illuminated grid, illuminated squares, a combination of any of the preceding or any of the preceding in combination with other features used to provide the plurality of individually identifiable locations in a manner visible to the user.

The user interfaces 112, 114 are located adjacent the playing surface 109 in the illustrated embodiment. The first user interface 112 is associated with the first plurality of pieces 104 (the white pieces) and the second user interface 114 is associated with the second plurality of pieces 106 (the black pieces). According to the illustrated embodiment, each of the two user interfaces 112, 114 include the same elements. As illustrated, these include a first button 116, a second button 117, a pair of handicap-select buttons 118, a handicap-level indicator 119 and chess-piece selection icons 120.

According to one embodiment, the chessboard 102 includes a multilayer construction that includes a top plane located at the top of a frame (not illustrated). According to further embodiments, the frame includes a hollow interior region located beneath the top plane. According to some embodiments, the interior region is suitable for housing an integral electronic system, for example, as illustrated and described with reference to FIG. 2.

In some embodiments, the top plane itself has a multi-layer construction. In one embodiment, the playing surface 109 and the user interfaces 112, 114 are included as graphics printed on a top surface layer of the top plane. Depending on the embodiment, the top surface layer can include one or more semi-transparent plastic sheets with opaque graphics. As described in greater detail herein, these layers can include one or more layers that include electronic sensing and/or circuitry. Therefore, the bottom layer of the top plane can include conductive ink capacitive touch circuitry. This can include inks that are opaque and conductive. When fully assembled and located above a lighting array (also within the frame of the chess board 102), each of the individually identifiable locations, for example, the square 111 can both detect capacitive properties of the chess pieces 104, 106 and display information about the game via the playing surface 109. The display of information can include the representation of different display-elements, for example, as illustrated and described with reference to FIG. 1C.

As is described in greater detail herein, the information displayed via the playing surface 109 can include the communication of moves to the user. In various embodiments, the moves are displayed in response to the human user's selection of any one of the plurality of chess pieces, for example, a selection by the user 110 touching the second rook 105D as illustrated in FIG. 1. In general, the moves that are displayed to the user 110 can be selected for display based on the handicap-level desired for the user. That is, the handicap-level corresponding to a desired level of assistance for the user. To provide the user with an increased understanding of possible moves, a legend is employed with the chess set 100 to distinguish the strength of various moves. FIGS. 1B and 1C provided additional background concerning the preceding.

FIG. 1B illustrates the system of coordinates used to uniquely identify each square on the chessboard. Each square of the chessboard is identified by a unique coordinate pair—a combination of a letter and a number. The vertical columns of squares are labeled a through h from white's left to right. The horizontal rows of squares are numbered 1 to 8 starting from white's side of the board. Thus, each square has a unique identification of a letter followed by a number. For example, the square 111 is unique identified by the alphanumeric ID of "h7".

Referring to FIG. 1C, a legend 121 for the respective display-elements used to represent various move-categories when displayed by the chessboard 102 is provided in accordance with one embodiment. The legend includes a leftmost column that refers to the unique identifier where one of the move-categories appears in FIG. 1A. The center column of the legend 121 describes a strength of the move-category. The leftmost column illustrates the display-element that is used to represent the move-category. In the illustrated example, the leftmost column includes a first display-element 122, a second display-element 124, a third display-element 126 and a fourth display-element 128.

In FIG. 1C, the display-element that is employed to differentiate between move categories is a polka dot pattern in which the size of the dots increases as a strength of the move-category increases. As indicated in the legend 121, the first display-element 122 includes a field of the largest polka dots. The first display-element 122 is representative of an excellent move and can be found at position A6 on the playing surface 109 in FIG. 1A. The second display-element 124 includes a field of the polka dots having the next largest size. The second display-element 124 is representative of an inaccurate move and can be found at position D1 on the playing surface 109 in FIG. 1A. The third display-element 126 includes a field of slightly smaller polka dots. The third display-element 126 is representative of a mistake and can be found at positions B1, C1 and A4 on the playing surface 109 in FIG. 1A. The fourth display-element 128 includes a field of the smallest polka dots. The fourth display-element 128 is representative of a terrible move and can be found at positions A2, A3 and A5 on the playing surface 109 in FIG. 1A. As is described in greater detail below, the illumination of move-categories can employ color to distinguish one move category from the other move categories. In various embodiments, the color illumination is provided by a controlling an operation of RGB LEDs included in a lighting array. According to one embodiment, the illumination is controlled to maintain moves in a selected move-category illuminated but not distinguished to more rapidly increase the user's understanding of the game of chess. As one example, moves categorized as blunders can be illuminated in a red color with the other highlighted moves all illuminated in a white color. This example can assist a player in avoiding blunders while providing them with the freedom to choose among the other available moves without aid.

The quantity and type of move-categories can vary depending on the embodiment. According to one embodiment, a total of seven move-categories are employed including the categories blunder, mistake, inaccuracy, good, excellent, best and brilliant. Further, all move-categories may not be highlighted where, for example, moves in fewer than all the defined move-categories are available given the selected game piece and game state. In some instances, there will be no moves displayed, for example, where the selected game piece is in a position that is blocked from movement by other pieces on the playing surface 109.

While the above description concerning the display-elements 122, 124, 126, 128 describes a dot-size as a distinguishing feature, the use of RGB LEDs allows the different display-elements to be distinguished by color either alone or in combination with other features. The use of a lighting mask allows the other features to include both patterns and shapes that distinguish various display-elements from one another. The patterns and shapes can also be combined with color variations and/or light intensity. In some embodiments, light intensity can be varied to attract the user's attention to a move that is important for them to understand (for example, blinking or pulsing). According to some embodiments, display-elements can be established to clearly identify a rank among moves in a single move-category.

Referring now to FIG. 2, an electronic system 230 for inclusion in a chess set is illustrated in accordance with various embodiments. In some embodiments, the elements included in the electronic system 230 are all housed in the chessboard 102 illustrated in FIG. 1A. The electronic system 230 includes a processor, a touch sensitive system 234, a lighting array 236, a power source 238, a memory 240, a wireless communication system 242 and a user interface 244. The electronic system 230 can include one or more power busses and one or more communication busses. The communication busses can be used for the communication of instructions/commands and data between the illustrated components and other components included in the device depending on the embodiment. The power busses can be used to distribute operating power at one or more voltage levels to the elements of the electronic system 230.

Depending on the embodiment, the processor 232 can include one or more of a microcontroller, microprocessor or other processing element. According to one embodiment, the processor includes an integral BLUETOOTH low energy wireless communication system. In general, the processor 232 executes stored instructions to control the overall operation of the chessboard, a processing of input received from the touch sensitive system 234, operation of the lighting array to provide information to the user in response to receipt of a touch input or provide other feedback to the user(s). The processor 232 operates to perform other functions and operations depending on the embodiment. For example, the processor 232 can operate to process various types of inputs, for example, commands, instructions or prompts received via the user interfaces 112, 114 and/or from a user's electronic device. According to one embodiment, the processor 232 is included in a microcontroller that also includes capacitive-touch I/O, a BLUETOOTH communication system and memory.

The touch sensitive system 234 can employ different touch-sensitive technology depending on the embodiment. According to some embodiments, a capacitive sensing system is employed. A capacitive sensing system can include a capacitive sensing array in contact with the playing surface 109, for example, as a part of the top plane initially described with reference to FIG. 1A. The capacitive sensing circuit can employ self-capacitance or mutual capacitance depending on the embodiment. In addition, the capacitive circuitry can be laid out as individual sensors with one sensor per playing square (for example, including a sensor for the square 111). Alternatively, the capacitive sensing system can include sensing by row and column at an 8×8 resolution or higher resolution grid if desired. According to these embodiments, each of the chess pieces 104, 106 is conductive. The preceding can be achieved by a variety of ways depending on the embodiment. For example, the chess pieces 104, 106 can be manufactured from a conductive material. According to another embodiment, the chess pieces 104, 106 are manufactured from a non-conductive material but include a conductive exterior finish, for example a conductive paint, lacquer or other surface coating.

Where capacitive sensing is employed, the change in capacitance is sensed by the touch sensitive system 234 when a user makes contact by touching a selected one of the chess pieces 104, 106. The processor 232 employs the information concerning the change in capacitance to determine a location on the playing surface 109 where the selected chess piece is located. With this information the processor identifies the set of moves that are currently available for the selected chess piece.

According to another embodiment, the touch sensitive system 234 employs a membrane keypad, for example, a flexible membrane keypad that is included in the top plane. The flexible membrane can include a checkerboard pattern, for example, as typically found in a chessboard. So, while the membrane is referred to as a "keypad" the "keys" can be provided as an alternating grid of light and dark squares without any indicia. According to this embodiment, the chess pieces 104, 106 are not conductive. Instead, the user applies a downward force to press the selected chess piece onto the playing surface 109. This pressure flexes the membrane to complete an electrical contact located beneath the top surface of the membrane. Here too, the processor 232 employs the information received from the touch sensitive system 234 to determine a location on the playing surface where the selected chess piece is located. With this information the processor identifies the set of moves that are currently available for the selected chess piece. The operations of the system described herein concerning a display of available moves and available move-categories on the chessboard 102 can be provided in each of the various embodiment of the touch sensitive system 234.

The lighting array operates to provide backlighting to the playing surface 109. For example, the lighting array 236 is employed to illuminate the playing surface 109 with one or more available moves in a manner that also conveys the move-category (for example, a strength of a move). In some embodiments, the backlighting can also be employed to assist in defining the playing surface and/or operation of the user interfaces 112, 114. The lighting array 236 includes a plurality of LEDs in accordance with one embodiment. In some embodiments, the lighting array 236 includes color RGB LEDs.

The power source 238 can include one or more batteries, for example, lithium or alkaline batteries. Further, the power source 238 can include a replaceable power source or a rechargeable power source depending on the embodiment. Where a rechargeable power source is employed, the power source 238 can include recharging circuitry to regulate charging operations. The recharging circuitry can include a wired electrical connection available from an exterior of the chessboard 102. According to another embodiment, wireless inductive charging is used to recharge the power source 238 included in the electronic apparatus 230.

The memory 240 is configured to store software instructions 241 in accordance with various embodiments. The software instructions can include one or more algorithms or other programs, for example, algorithms for determining a chess piece selected by the user, determining each of the moves available for a given state of a chess match, determining the move-strength and associated move-category of available moves, determining a player's selection of a game piece and displaying the moves available to the player for the selected game piece given the game-state and in view of the player's handicap. In one embodiment, the memory 240 is included in the processor 232. In another embodiment, the memory 240 includes memory internal to the processor 232 and memory external to the processor 232.

Depending on the embodiment, the wireless communication system 242 can include BLUETOOTH, or BLUETOOTH LE wireless communication systems, respectively, or Wi-Fi communication. The wireless communication system 242 can be included as a standalone element or included in the processor 232 depending on the embodiment. According to some embodiments, the wireless communication system 242 can operate to communicate with a user's personal electronic device when the chessboard 102 is in use.

In operation, the electronic system 230 receives a user input via either or both of the user interfaces 112, 114 to establish the parameters for a chess match. Operations that provide the electronic system 230 with information employed during the match can include: identifying whether the match is between the user and another human or an AI opponent, for example, using the first button 116; locating the chess pieces on the board at the start of a match, for example, using the second button 117 and the chess-piece selection icons 120; and establishing a handicap level for either a human player or an AI opponent using the handicap-select buttons 118.

Figure 3:
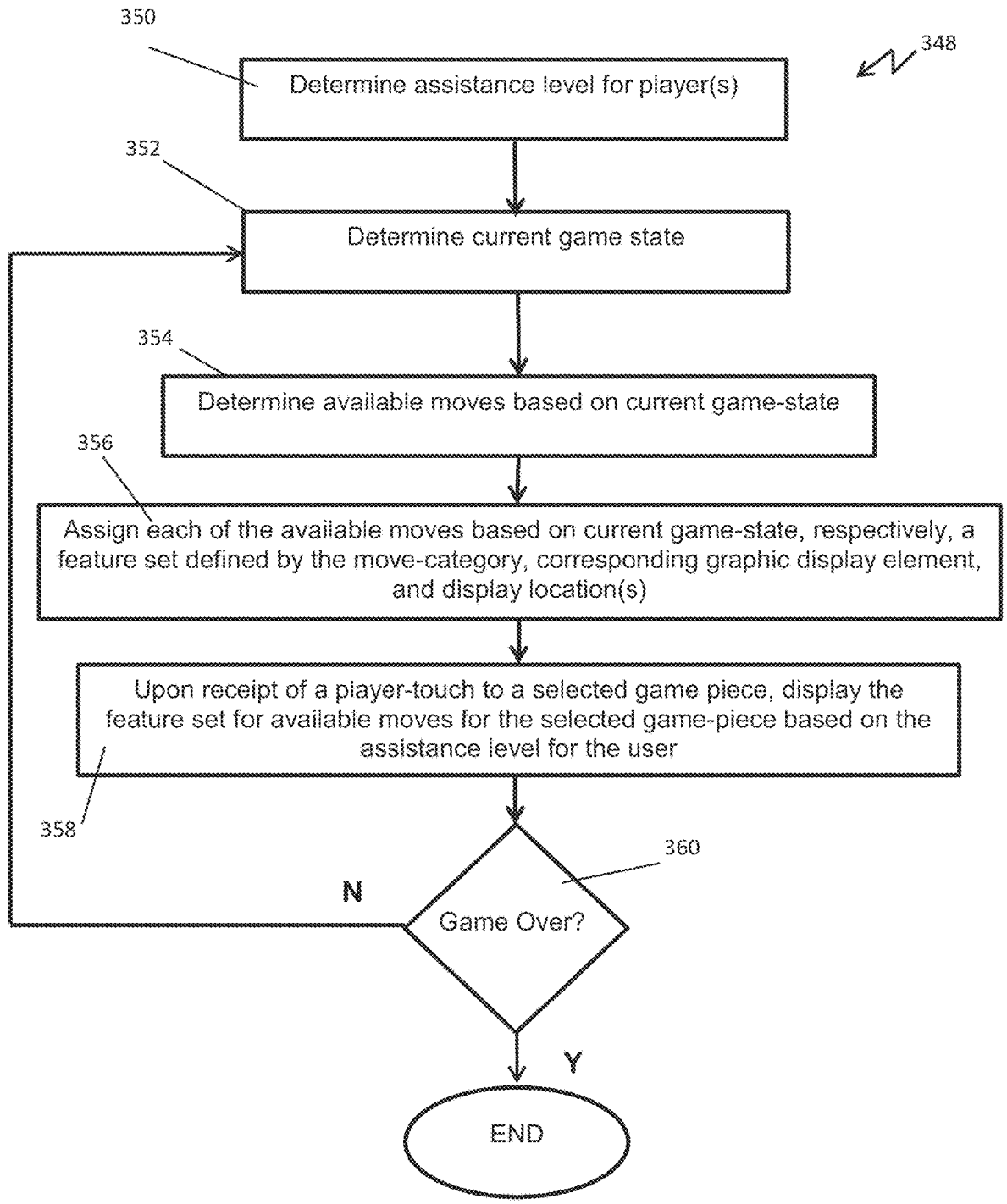
FIG. 3 illustrates a flow diagram of a process employed with the electronic game board of FIG. 1A according to one embodiment.

Referring now FIG. 3, a flow diagram of a process 300 that employs an integral electronic system to control a display of moves in a chess match is illustrated in accordance with one embodiment. The process 300 illustrates a series of operations that can be employed to determine each of the moves available for a given state of a chess match, determine a player's selection of a game piece and customize the highlighting of the moves available to the player for the game piece given the game-state and in view of the player's handicap. In some embodiments, the process employs a touch-based identification of the chess piece selected by the user.

In FIG. 3, the following operations are included in the process 348: determining an assistance level for the player (s) 350; determining a current game-state 352; determining available moves based on the current game-state 354; assigning a move-category to each of the available moves 356 and displaying a feature set for available moves when a player selects a game piece 358. The process 348 also includes a decision point to determine whether the game is over 360.

The process 348 begins at the act of determining an assistance level for the players in a chess match 350. The players can include a human user and an AI opponent or two human players competing against one another. Where the match is played by two human users, the assistance level can correspond to a handicap level that the user(s) select at the start of a match. Where the match is between a human user an AI opponent the user selects a handicap level for himself and a handicap level for the AI opponent. In various embodiments, the handicap level can provide nuanced differences in the manner in which the available moves are highlighted for the human user(s). For example, the element of user-driven discovery is present in embodiments where moves are not presented unless a user actually selects a chess piece. Even then, the moves that are displayed are only those that are available for the selected chess piece.

Additional refinement is available because a user's handicap level can result in different forms of highlighting to selectively distinguish, or not, the various categories of moves. That is, in some embodiments, a separate color is used to distinguish moves in each move-category from moves in other move categories. Optionally, fewer than all available move-categories are distinguished as a result of the handicap selected for the user. According to these embodiments, the moves in all move categories can be illuminated in a manner that distinguishes the moves in at least one move-category from the moves in the other move categories. In some embodiments, moves in a plurality of move-categories are separately distinguished from one another using colored illumination (i.e., illumination using a unique color for each move-category) and moves in a plurality of different move-categories are all illuminated in a common color that does not distinguish these move-categories from one another. In addition, the electronic system 230 can operate to evaluate a user's skill in a prior match or matches and automatically adjust a player's handicap level for subsequent matches.

The user input(s) at the start of the match can also include setting up the board by positioning all pieces at a starting point. This can include locating each piece on the playing surface 109 and providing the electronic system 230 with inputs that allow the system to identify the starting location of each piece on the board. In addition, the user input can include identifying the player whose turn it is, whether castling options are available in the match, whether pawn promotion is available and whether en passant capture is available in the match.

With the assistance level known, the process 348 moves to determining the current game-state 352. At the start of a match, the user input concerning the match setup is employed by the electronic system 230 to determine a current location of each piece on the playing surface 109, for example, using the coordinate system illustrated and described with reference to FIG. 1B. Following the initial move and thereafter, the electronics system 230 detects a change in location of a chess piece upon completion of a move. In one embodiment, the electronic system 230 employs capacitive sensing to determine the change in location of a chess piece upon completion of a move. In another embodiment, the user first presses the chess piece downward on the playing surface at the original location of the piece to activate a first membrane switch and does the same at the location of the chess piece upon completion of the move. With the chess pieces in these known locations the electronic system 230 determines the current game-state at the act 352

With the game-state known, the process 348 moves to determining available moves based on the current game-state 354. Here, the electronic system 230 employs the pre-defined moves associated with each chess piece, respectively, along with the current location of the game pieces on the playing surface 109 to determine the availability of moves for each of the chess pieces currently located on the playing surface 109. The user input concerning the availability and definition of specialty moves such as castling, pawn promotion and en passant capture is also employed. According to one embodiment, the act of determining the current game state 352 and the act of determining available moves based on the current game-state 354 are combined in a single act. According to one embodiment, the process can include a determination of available future moves one or two turns ahead based on predicted moves. This approach can speed up the processing and display of moves when a match is being played in a fast-play format.

The process 348 continues by assigning a feature set to each of the available moves 356. According to this embodiment, this act includes identifying the move-category, corresponding display-element, and display location(s) for each of the available move(s). In one embodiment, the available move-categories and associated display-elements include those illustrated and described with reference to FIG. 1C. However, other categories and display-elements can be employed depending on the embodiment. According to some embodiments, the process employs a point-based scoring system to rank available moves where a first range of scores is associated with a first move-strength, a second range of scores is associated with a second move strength and additional ranges are associated with different categories of move strengths. In one embodiment, the score is established using a scoring system based on a unit of measure referred to as a "centipawn" which is known in the art. According to this embodiment, a centipawn equals 1/100 of a pawn and 100 centipawns=1 pawn and total scores can range from −100 (signifying a black victory) to +100 (signifying a white victory). According to one embodiment, the move-category is established based on a probability of winning rather than the centipawn scoring system.

In some embodiments, the electronic system 230 operates a process in which it searches a game tree to determine the score for a move based on a series of post-move outcomes that can result. According to one embodiment, this includes a min-max algorithm using alpha-beta pruning to decrease the number of nodes that are evaluated, for example, by evaluating available moves based on the players making an optimal move at each of the forward looking game-states. According to another embodiment, a monte-carlo algorithm is employed. According to this embodiment, the process operates by trying random moves, identifying those that are the most promising and further exploring results of those moves in more depth. In general, these approaches operate by trying moves and working backwards to determine the strength of a move that is currently available based on the game state. In a further embodiment, the move-strength for the opening series of moves in a match is determined using a library of moves that are known to be good.

The different move-categories and associated display-elements are established before the start of a match by the user, the AI chess assistant or a combination of the two. The electronic system 230 processes the inputs, the calculated move-strengths and operates to display the moves such that they are visible on the playing surface 109 in the manner that communicates the move-strength to the user. The locations of the display correspond to selected ones of the individually identifiable locations (for example the square 111) on the playing surface that correspond to the destination of the selected chess piece, for example, the second rook 105D.

According to the illustrated embodiment, the feature set for available moves is not displayed until a player selects a game piece. FIG. 3 refers to a "player-touch." The preceding is consistent with the rules of chess that allow a user to grasp a piece and temporarily move it to another position on the chessboard provided that they keep the selected chess piece in their grasp. The location of the chess piece is established at the location on the board where the player releases their grasp. There are multiple approaches that can be employed by the electronic system 230 to determine when a player selects a piece by "touch." These can include capacitive sensing where touch alone is enough for the system to detect the selection. However, other embodiments can require that the user apply a light pressure on the chess piece in a direction of the playing surface to complete an electrical contact provided by a membrane keypad.

Once the electronic system 230 identifies that a move is complete, the process 348 moves to the act of determining whether the game is over 360, for example, a checkmate or stalemate condition exists. If the game is complete, the process 348 ends. Alternatively, where the game is on-going, the process 348 returns to the act of determining the current game-state. Here, the location of each piece on the chessboard is determined following the immediately preceding move. Depending on the move (for example, whether or not a piece is captured) the updated game state can include a change in location of one or two chess pieces.

Referring to FIG. 1A again to describe the process 348, the user 110 is in contact with the second rook 105D. As a result, the moves available in a plurality of move-categories as defined by the strength of the move are displayed by the electronic system 230 on the board 102. In the illustrated example, all legal moves available with the selected chess piece are displayed using different display-elements to represent different move-categories, respectively. The display-elements can be created using a variety of approaches depending on the embodiment. In some embodiments, color RGB LEDs are employed to illuminate the playing surface and the user interfaces. In one embodiment, an LED backplane is located beneath the playing surface. Additional approaches that can be used alone or combination with the preceding or one another include having multiple LEDs per independently identifiable game-board location, the use of light guides, light guide films, mirrored surfaces, lens or other light-routing techniques.

In FIG. 1A, a move of the second rook 105D from its current location to the location of black's bishop at A6 is identified as an excellent move because black's bishop is captured. This is indicated with the first display-element 122 displayed at the location A6. A single move (moving the selected piece to the location D1) is identified as an inaccurate or okay move. This is indicated using with the second display-element 124 displayed at the location D1. Moves of the second rook 105D to any of A4, B1 or C1 are identified as mistakes as indicated with the display of third display-element 126 at those three locations on the playing surface 109. Moves to any of A2, A3, A5 are identified as mistakes as indicated with the display of fourth display-element 128 at those three locations on the playing surface 109.

According to further embodiments, the electronic system 230 operates to provide adaptive assistance. In these embodiments, the system evaluates the handicap of the players during play in view of the current likelihood of winning to determine whether an in-match adjustment will provide the benefit of a more competitive match. The handicap can be changed based on the amount that a player is either ahead or behind of their opponent. Where the system 230 operates to adjust the handicap during play, the distinction of the various move-categories is modified such that the highlighting remains consistent with the handicap level of the player.

While shown and described with reference to a chess set, embodiments described herein can also be employed to assist a user to increase their level of skill and enjoyment of different games that use different games pieces. These can include board games like Monopoly, Go, backgammon and Chinese checkers as a non-exhaustive list of examples. In each case, the electronic system 230 is integrated into a frame that includes the game board. The playing surface can include a transparent layer and a mask and may also include a conductive layer. Where touch sensitive capacitive game-piece detection is employed conductive game pieces can be employed in any of these embodiments. A lighting array can be included beneath the playing surface. According to these embodiments, the electronic system 230 includes algorithms employed to determine each of the moves available for a given state of the game, determine a player's selection of a game piece and display the moves available to the player for the game piece given the game-state and in view of the player's handicap.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of assisting a human player in a chess match, the chess match played using a chessboard including an electronic system with an illumination system, the chessboard included in a chess set including a plurality of chess pieces, the method comprising:

identifying a skill level of the human player for the chess match;

determining a current location on the chessboard of each chess piece included in the plurality of chess pieces that remains on the chessboard;

identifying a move strength from among a plurality of move-strength categories for each move included in a set of valid moves available for a selected chess piece that remains on the chessboard with each chess piece in its respective current location on the chessboard, the set of valid moves available for the selected chess piece including at least a first subset of moves having a first move strength, a second subset of moves having a second move strength, and a third subset of moves having a third move strength, the first move strength being different than the second move strength and the third move strength, the second move strength being different than the third move strength;

sensing contact by the human player with the selected chess piece, the sensing provided by the electronic system;

in response to the sensed contact, using the illumination system to display on the chessboard each of: at least one move selected from the first subset of moves, at least one move selected from the second subset of moves and at least one move selected from the third subset of moves available for the selected chess piece, the at least one move selected from the first subset of moves uniquely identified via the illumination system from the at least one move selected from the second subset of moves and the at least one move selected from the third subset of moves to improve the skill level of the human player;

selecting a plurality of moves for inclusion in a group of moves based, at least in part, on the skill level of the human player and the move strength categories of respective moves to be included in the group, the plurality of moves including the at least one move selected from the second subset of moves and the at least one move selected from the third subset of moves;

illuminating all moves included in the group of moves such that a difference between the second move strength and the third move strength is imperceptible based on the illumination; and modifying a selection of the move strength categories of moves to be included in the group of moves in response to a change in the skill level of the human player.

2. The method of claim 1, wherein each of the plurality of chess pieces is conductive, and wherein the sensing contact step includes sensing contact based on a change in capacitance determined by the electronic system.

3. The method of claim 1, further comprising excluding moves that have a low strength from the moves displayed on the chessboard via the illumination system only when at least one higher strength move is available for the selected chess piece.

4. The method of claim 1, further comprising maintaining the set of moves available for the chess piece unilluminated when the human player is not making contact with the selected chess piece.

5. An electronic chess set, comprising:
a plurality of game pieces;
a chessboard having a playing surface including a plurality of individually identifiable locations visible to a user on the chessboard, each of the locations configured to receive any one of the plurality of game pieces;
an illumination system configured to illuminate each of the plurality individually identifiable locations; and
an electronic system coupled to the illumination system, the electronic system including a processor configured to determine when the user is in contact with a selected one of the plurality of game pieces and control an operation of the illumination system to illuminate the playing surface to provide a visual identification of a plurality of valid moves available for the selected piece based on both a current location of the plurality of game pieces for a chess match being played on the chessboard and a chess skill level of the user,
wherein the plurality of valid moves each have an associated move strength selected from a plurality of move strength categories including at least a first subset of moves having a first move strength, a second subset of moves having a second move strength, and a third subset of moves having a third move strength, the first move strength being different than the second move strength and the third move strength, the second move strength being different than the third move strength,
wherein the illumination system is configured to illuminate the playing surface to illuminate at least one move selected from the first subset of moves, at least one move selected from the second subset of moves and at least one move selected from the third subset of moves available for the selected piece, the at least one move selected from the first subset of moves uniquely identified via the illumination system from the at least one move selected from the second subset of moves and the at least one move selected from the third subset of moves,
wherein the illumination system is configured to illuminate a group of moves including the at least one move selected from the second subset of moves and the at least one move selected from the third subset of moves in a manner where a difference between the second move strength and the third move strength is imperceptible based on the illumination, wherein the electronic system is configured to associate the at least one move selected from the second subset of moves and the at least one move selected from the third subset of moves together in the group of moves based, at least in part, on the chess skill level of the user and the move strength categories of respective moves to be included in the group, and wherein the electronic system is configured to modify a selection of the move strength categories of moves to be included in the group of moves in response to a change in the chess skill level of the user.

6. The electronic chess set of claim 5,
wherein the electronic system is configured to display a plurality of different display-elements, each of the plurality of different display-elements corresponding to at least one of the plurality of move-strength categories, respectively.

7. The electronic chess set of claim 6, wherein the electronic system is configured to maintain the playing surface in an unilluminated state concerning available moves until the user is in contact with the selected one of the plurality of game pieces.

8. The electronic chess set of claim 5, further comprising a capacitive sensing system coupled to the processor, the capacitive sensing system included in the playing surface and configured to identify a change in capacitance resulting when the user is in contact with the selected one of the plurality of pieces.

9. The electronic chess set of claim 8, wherein the plurality of game pieces are conductive.

10. The electronic chess set of claim 5, wherein at least one of the first subset of moves, the second subset of moves, and the third subset of moves includes a single move.

11. The electronic chess set of claim 5, wherein the electronic system is configured to employ the chess skill level of the user to determine whether to uniquely identify a move in the first subset of moves via the illumination system.

12. The electronic chess set of claim 5, wherein the electronic system is configured to employ the chess skill level of the user to determine whether to display via the illumination system all available moves for the selected piece.

13. The electronic chess set of claim 5, wherein the electronic system is configured to employ the chess skill level of the user to determine whether to distinguish moves in at least three different move-strength categories from one another via the illumination system.

14. The method of claim 1, further comprising including only a single move in at least one of the first subset of moves, the second subset of moves, and the third subset of moves.

15. The method of claim 1, further comprising operating the illumination system to uniquely identify the at least one move selected from the first subset of moves based on the skill level.

16. The method of claim 15, further comprising including a plurality of moves in the first subset of moves, and
illuminating each of the plurality of moves in the first subset of moves in a manner that associates each with the first move strength.

\* \* \* \* \*